United States Patent
Ujiie et al.

(10) Patent No.: US 7,619,958 B2
(45) Date of Patent: Nov. 17, 2009

(54) PICKUP APPARATUS FOR MULTI-LAYER OPTICAL DISC

(75) Inventors: Masahiko Ujiie, Iwata (JP); Takayuki Hayashi, Toyokawa (JP); Takuo Tanaka, Wako (JP); Satoshi Kawata, Wako (JP)

(73) Assignees: Pulstec Industrial Co., Ltd. (JP); Riken (JP)

( * ) Notice: Subject to any disclaimer, the term of this patent is extended or adjusted under 35 U.S.C. 154(b) by 506 days.

(21) Appl. No.: 11/672,815

(22) Filed: Feb. 8, 2007

(65) Prior Publication Data

US 2007/0183292 A1 Aug. 9, 2007

(30) Foreign Application Priority Data

Feb. 9, 2006 (JP) ............................. 2006-032922

(51) Int. Cl.
*G11B 7/00* (2006.01)
(52) U.S. Cl. ............................................. 369/112.01
(58) Field of Classification Search .......... 369/112.01, 369/112.02, 112.1, 44.23, 44.24, 118
See application file for complete search history.

(56) References Cited

U.S. PATENT DOCUMENTS 7,227,704 B2 * 6/2007 Koike ..................... 359/719

FOREIGN PATENT DOCUMENTS

| JP | 5-182200 A | 7/1993 |
| JP | 2004-355791 A | 12/2004 |

* cited by examiner

Primary Examiner—Nabil Z Hindi
(74) Attorney, Agent, or Firm—Rossi, Kimms & McDowell LLP

(57) ABSTRACT

An optical pickup apparatus comprises an orbicular zone forming lens group 14 for forming the section of the laser beam, which is irradiated to an optical disc DK having plural recording layers, into an annular shape, a condenser lens 35 that converges the reflected beam from the optical disc DK, and a pinhole plate 36 having formed thereto a pinhole 36a with a size corresponding to a flux diameter of the reflected beam converged by the condenser lens 35. The orbicular zone forming lens group 14 refracts the laser beam irradiated to the optical disc DK so as to form the section of the laser beam into an annular shape in order that the internal diameter of the annular converged flux formed on the pinhole plate 36a by the reflected beam from the recording layers other than the recording layer having an optical spot formed thereon becomes greater than the diameter of the pinhole 36a.

15 Claims, 7 Drawing Sheets

PICKUP APPARATUS FOR MULTI-LAYER OPTICAL DISC

BACKGROUND OF THE INVENTION

1. Field of the Invention

The present invention relates to an optical pickup apparatus that irradiates laser beam to a multi-layer optical disc having plural recording layers, and receives reflection light from the multi-layer optical disc, in order to reproduce a signal recorded on the multi-layer optical disc.

2. Description of the Related Art

In general, an optical pickup apparatus is used in an optical disc apparatus that records a signal on an optical disc, such as CD, DVD, BD (Blu-ray Disc), HD DVD, or the like, or reproduces a signal recorded on an optical disc. The optical pickup apparatus converges laser beam emitted from a laser source onto an optical disc by an objective lens, and receives the reflection light from the optical disc by a photodetector, so as to output an electrical signal according to the amount of received light.

In such an optical pickup apparatus, it has conventionally been demanded to increase a storage capacity. As a method for increasing the storage capacity of the optical disc, there are mainly two schemes, i.e., the enhancement of recording density and increase in the number of the recording layer. Of these schemes, the enhancement of recording density can be realized by increasing numerical aperture of the objective lens that converges laser beam onto the optical disc and shortening a wavelength of laser beam. However, increasing the numerical aperture of the objective lens and shortening the wavelength of laser beam are reaching their limit, and hence, it is extremely difficult to further increase the numerical aperture of the objective lens and shorten the wavelength of laser beam.

On the other hand, as for increasing the number of recording layer of the optical disc, a "two-layer disc" having two recording layers laminated on one substrate is standardized in, for example, a BD (Blu-ray Disc). The development of a multi-layer optical disc having more plural recording layers laminated has been expected. For example, Japanese Unexamined Patent Application No. 2004-355791 discloses an optical disc apparatus wherein various parameters, such as numerical aperture and tilt angle of optical axis of laser beam, are appropriately set corresponding to a multi-layer optical disc having five or more recording layers.

However, in the multi-layer optical disc, since a part of the laser beam irradiated to the recording layer, which is a subject of signal reproduction, is irradiated to the recording layers other than the aforesaid recording layer, an interlayer crosstalk occurs in which the reflection lights from the other recording layers are overlapped with the reflection light from the recording layer that is the subject of signal reproduction. In this case, the electrical signal outputted from the photodetector includes the signal recorded on the other recording layers due to the interlayer crosstalk, resulting in entailing a problem of deteriorating reproduction precision of the signal recorded on the recording layer that is the subject of signal reproduction. Since the interlayer crosstalk increase with the increase of the number of the recording layer, the interlayer crosstalk becomes a significant problem in a multi-layer optical disc that has been further developed and has more recording layers laminated.

SUMMARY OF THE INVENTION

The present invention is accomplished in view of the above-mentioned problem, and aims to provide an optical pickup apparatus that can achieve a satisfactory reproduction precision of a signal recorded on a recording layer, which is the subject of signal reproduction, without being affected by an interlayer crosstalk in a multi-layer optical disc.

In order to accomplish the object described above, an aspect of the present invention is an optical pickup apparatus comprising: a laser source that emits laser beam to a multi-layer optical disc having plural recording layers; a photodetector that receives the laser beam reflected by the multi-layer optical disc and outputs an electrical signal according to the received amount of beam; a collimator lens that converts the laser beam incident thereto from the laser source into parallel beam; a beam splitter that transmits or reflects the laser beam, which is converted into parallel beam by the collimator lens, to be led to the multi-layer optical disc, and transmits or reflects the laser beam reflected by the multi-layer optical disc to be led to the photodetector; an objective lens that converges the laser beam, which is led to the multi-layer optical disc by the beam splitter, so as to form an optical spot on one of the plural recording layers; a condenser lens that converges the laser beam from the multi-layer optical disc led by the beam splitter in the vicinity of the photodetector; orbicular zone forming optical means that is arranged between the collimator lens and the beam splitter, or between the beam splitter and the condenser lens, for forming the section of the laser beam into an annular shape by refracting the laser beam converted into the parallel beam by the collimator lens; and a pinhole plate having formed thereto a pinhole that transmits the laser beam reflected from the above-mentioned one recording layer and converged by the condenser lens, wherein the laser beam, that is reflected from a recording layer other than the one recording layer, forms an annular converged flux at the periphery of the pinhole of the pinhole plate. In this case, for example, the internal diameter of the annular converged flux formed at the periphery of the pinhole of the pinhole plate might be greater than the diameter of the pinhole. In other word, the orbicular zone forming optical means defines the internal diameter of the laser beam that is reflected from the other recording layer other than the above-mentioned recording layer and formed into an annular shape such that the annular converged flux formed on the pinhole plate has the internal diameter substantially greater than the diameter of the pinhole.

In this case, the orbicular zone forming optical means may be configured to include a first optical device that converts the laser beam, which is converted into the parallel beam by the collimator lens, into annular divergent beam, and a second optical device that converts the laser beam, which is converted into the annular divergent beam, into the annular parallel beam. In this case, a conic axicon may be used for the first optical device and the second optical device. The axicon includes, in this case, any optical devices having the function equivalent to the axicon, irrespective of the name, such as cone lens, cone prism, conical lens, conical prism, and the like, in addition to axicon lens and axicon prism. Further, the axicon includes plate-like Fresnel axicon or holographic axicon having the function equivalent to the axicon. Further, instead of these axicons, or in combination with these axicons, a spherical lens or aspherical lens may be used.

The internal diameter $\phi_S$ of the laser beam that is annularly formed by the orbicular zone forming optical means may be defined by the equation of $\phi_S \geq f_C \times \phi_P/L$, wherein the focal distance of the condenser lens is $f_C$, the diameter of the pinhole is $\phi_P$, and the distance from the convergent point, where the laser beam reflected by the other recording layers is converged by the condenser lens, to the pinhole is L. Instead of the equation described above, the internal diameter of the laser beam annularly formed by the orbicular zone forming optical means may be defined by the equation of $\phi_S \geq f_C \times \phi_P/L + \phi_P$.

According to the aspect of the present invention thus configured, the pinhole plate on which the pinhole, having the size corresponding to the diameter of the flux of the converged laser beam, is formed is arranged at the converging position of the laser beam reflected by the recording layer, having the optical spot formed thereon, of the multi-layer optical disc. The orbicular zone forming optical means that forms the section of the incident laser beam into the annular shape is arranged between the collimator lens and the beam splitter, or between the beam splitter and the condenser lens. In this case, the internal diameter of the annularly formed laser beam, i.e., the diameter of the laser beam at the central portion where there is no beam, is formed such that the internal diameter (the diameter of the portion where there is no beam) of the annular converged flux formed on the pinhole becomes substantially greater than the diameter of the pinhole of the pinhole plate. Accordingly, there is substantially no chance that the laser beam reflected by the other recording layers of the multi-layer optical disc is led to the photodetector through the pinhole plate. Specifically, only the laser beam that is reflected from the recording layer of the multi-layer optical disc having the optical spot formed thereon to be converged by the condenser lens is substantially led to the photodetector through the pinhole formed on the pinhole plate. Therefore, the light-receiving signal outputted from the photodetector is substantially generated only on the basis of the signal recorded on the recording layer having the optical spot formed thereon. As a result, this configuration can provide satisfactory reproduction precision of the signal recorded on the recording layer, which is the subject of the signal reproduction, without being affected by the interlayer crosstalk.

The orbicular zone forming optical means refracts the laser beam, which is incident on the orbicular zone forming optical means, so as to form this laser beam into annular shape. Therefore, the laser beam can be led to the photodetector without reducing the quantity of light of the incident laser beam, whereby the output level of the electrical signal outputted from the photodetector cannot be reduced. As a result, the reproduction precision of the signal recorded on the recording layer, which is the subject of the signal reproduction, can be kept satisfactory, while eliminating the interlayer crosstalk included in the reflected light from the multi-layer optical disc.

Another aspect of the present invention is such that, in the optical pickup apparatus described above, internal-diameter adjusting means for changing the internal diameter of the annular laser beam formed by the orbicular zone forming optical means is further provided. In this case, the internal-diameter adjusting means may be configured to change the internal diameter of the annular laser beam formed by the orbicular zone forming optical means by, for example, changing the relative distance between the first optical device and the second optical device. By virtue of this configuration, the internal diameter of the annularly formed laser beam can be set for every multi-layer optical disc by appropriately adjusting the relative distance between the first optical device and the second optical device. Instead of this configuration, the internal-diameter adjusting means may be configured to change the internal diameter of the annular laser beam formed by the orbicular zone forming optical means by, for example, refracting the annular divergent beam converted by the first optical device to be led to the second optical device. By virtue of this configuration, the divergent beam converted by the first optical device can be led to the second optical device with the size of the divergent beam changed, by arranging an optical device (e.g., lens, prism) having a predetermined refractivity between the first optical device and the second optical device, whereby the internal diameter of the annularly formed laser beam can be set for every multi-layer optical disc. In this case, an optical device whose refractivity is changed in accordance with a predetermined electrical signal may be employed. Thus, the interlayer crosstalk can precisely be eliminated by a single optical pickup apparatus even between the multi-layer optical discs each having different degree of interlayer crosstalk.

Still another aspect of the present invention is such that, in the optical pickup apparatus described above, the internal diameter $\phi_S$ of the laser beam that is annularly formed by the orbicular zone forming optical means may be defined by the equation of $\phi_S \geq f_C \times \phi_P \times 2/L$, wherein the focal distance of the condenser lens is $f_C$, the diameter of the pinhole is $\phi_P$, and the distance from the convergent point, where the laser beam reflected by the other recording layers is converged by the condenser lens, to the pinhole is L. Instead of the above-mentioned equation of $\phi_S \geq f_C \times \phi_P \times 2/L$, the internal diameter of the laser beam annularly formed by the orbicular zone forming optical means may be defined by the equation of $\phi_S \geq f_C \times \phi_P \times 2/L + \phi_P$. The equation of $\phi_S \geq f_C \times \phi_P \times 2/L$ defines the internal diameter $\phi_S$ by using the distance half the distance L in the equation of $\phi_S \geq f_C \times \phi_P/L$. Further, the equation of $\phi_S \geq f_C \times \phi_P \times 2/L + \phi_P$ defines the internal diameter $\phi_S$ by using the distance half the distance L in the equation of $\phi_S \geq f_C \times \phi_P/L + \phi_P$. With this equation, the internal diameter $\phi_S$ increases by the amount corresponding to a half of the distance L, compared to the case where the internal diameter $\phi_S$ is defined by using the distance L. Therefore, the laser beam reflected from the layer other than the layer of the multi-layer optical disc where the laser beam is converged is more strictly eliminated. Accordingly, in case where the focus servo control of the objective lens is performed by an astigmatism control, an S-curve in a focus error signal can precisely be detected, whereby the focus servo control of the objective lens in the multi-layer optical disc can precisely be carried out.

Still another aspect of the present invention is such that, in the optical pickup apparatus defined by any one of the equations $\phi_S \geq f_C \times \phi_P/L$, $\phi_S \geq f_C \times \phi_P/L + \phi_P$, $\phi_S \geq f_C \times \phi_P \times 2/L$, and $\phi_S \geq f_C \times \phi_P \times 2/L + \phi_P$, the diameter $\phi_P$ of the pinhole is defined by the equation of $\phi_P \geq K \times \lambda/(\phi_C/(2 \times f_C))$, wherein the coefficient set by the distribution of light intensity of the laser beam emitted from the laser source is K, the wavelength of the laser beam emitted from the laser source is $\lambda$, and the diameter of the flux of the laser beam incident on the condenser lens from the multi-layer optical disc is $\phi_C$. With this equation, the laser beam reflected from the layer where the laser beam from the multi-layer optical disc is converged takes the diameter of the pinhole corresponding to the diameter of the converged flux converged by the condenser lens, whereby the laser beam reflected from the layer other than the layer where the laser beam is converged can strictly be eliminated. It is to be noted that the coefficient K is 1.22 when the light intensity distribution of the laser beam incident on the condenser lens is uniform. Supposing that the light intensity distribution is defined by the intensity of $1/e^2$ (e is a base of a natural logarithm), the coefficient K becomes 0.82. When the light intensity distribution is orbicular, the coefficient K takes a value generally 1.0 to 0.8 times the 1.22 (or 0.82).

Still another aspect of the present invention is such that, in the optical pickup apparatus described above, the objective lens is tracking-servo-controlled in the diameter direction of the multi-layer optical disc by tracking servo control means that causes the optical spot to follow the track of the multi-layer optical disc, and focus-servo-controlled in the optical axial direction of the laser beam by focus servo control means that makes the optical spot to follow each recording layer of the multi-layer optical disc, and the optical pickup apparatus comprises an actuator for displacing the orbicular zone forming optical means in the diameter direction of the multi-layer optical disc and optical axial direction of the laser beam, respectively, in accordance with the displacement of the objective lens by the tracking servo control means and the focus servo control means.

By virtue of this configuration, even if the positional relationship between the objective lens and the orbicular zone forming optical means varies due to the displacement of the objective lens in the diameter direction of the multi-layer optical disc and the optical axial direction of the laser beam by the tracking servo control means and the focus servo control means, this positional relationship can be kept constant by the actuator. Thus, the center of the portion, where there is no beam, of the annular converged flux reflected from the other recording layer and formed on the pinhole plate coincides with the center of the annular converged flux, so that they are always concentric. Specifically, there is no chance that the center of the annular converged flux, where there is no beam, is shifted, and the laser beam from the other recording layer passes through the pinhole of the pinhole plate. As a result, even if the objective lens displaces by the tracking servo control and focus servo control, a satisfactory reproduction precision of the signal recorded on the recording layer, which is the subject of the signal reproduction, can be provided without being affected by the interlayer crosstalk.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
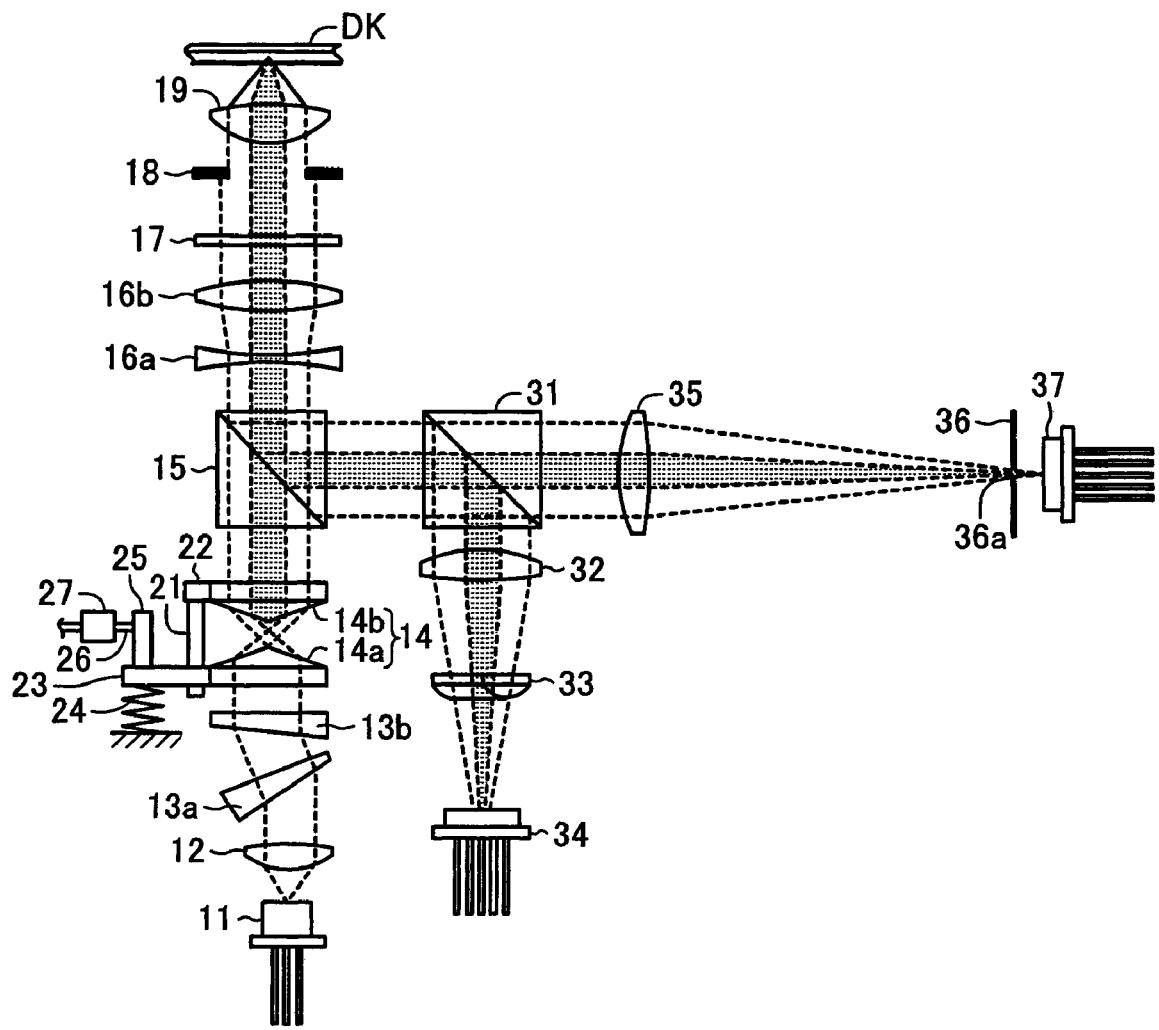
FIG. 1 is a schematic diagram showing an overall of an optical pickup apparatus according to one embodiment of the present invention.

One embodiment of an optical pickup apparatus according to the present invention will be explained hereinafter with reference to drawings. FIG. 1 is an overall schematic view of an optical pickup apparatus that irradiates laser beam to an optical disc DK such as BD (Blu-ray Disc) so as to record and reproduce a signal. The optical disc DK is a multi-layer optical disc having plural recording layers laminated at fixed intervals on one side. This optical pickup apparatus has, between a laser source 11 from which laser beam is emitted and the optical disk DK, a collimator lens 12, anamorphic prisms 13a, 13b, orbicular zone forming lens group 14, polarizing beam splitter 15, aberration correcting lens groups 16a, 16b, ¼ wavelength plate 17, aperture 18, and objective lens 19.

Figure 2:
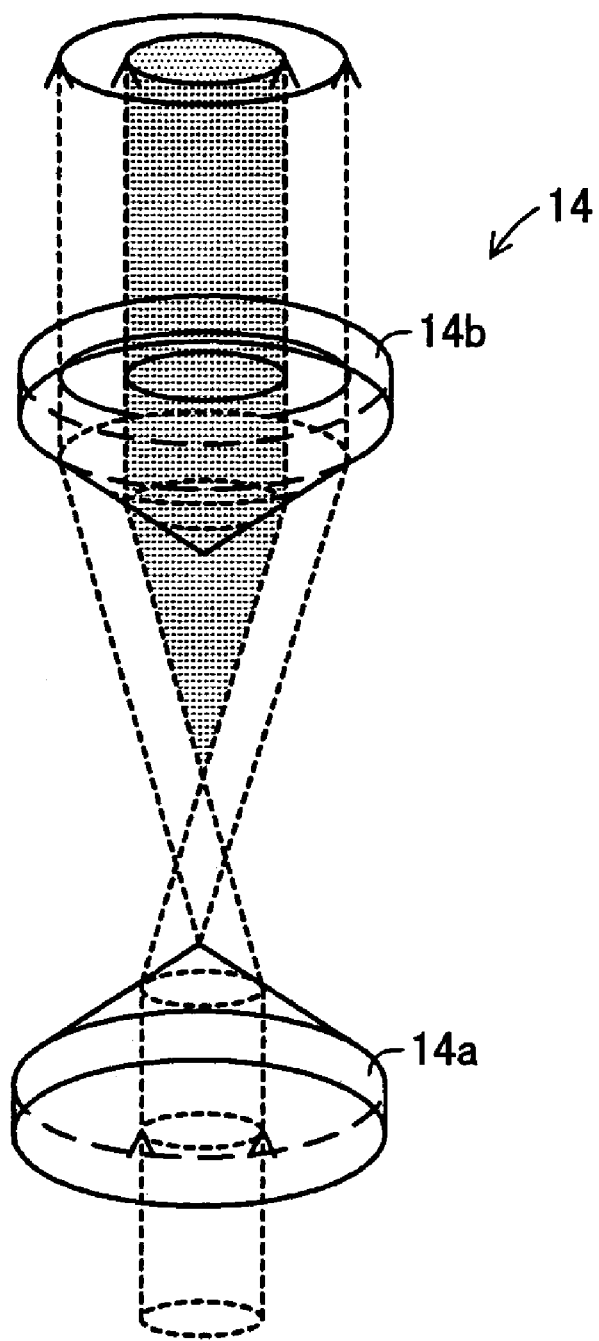
FIG. 2 is a perspective view of an orbicular zone forming lens group used in the optical pickup apparatus shown in FIG. 1.

The laser source 11 is composed of a semiconductor laser. It is controlled by a controller, not shown, so as to emit laser beam having a predetermined wavelength (e.g., 405 nm) to the optical disc DK. The collimator lens 12 converts the laser beam emitted from the laser source 11 into parallel beam. The anamorphic prisms 13a and 13b shape the section of the laser beam, which is converted into parallel beam by the collimator lens 12, into a circular shape. The orbicular zone forming lens group 14 is composed of a pair of first axicon 14a and second axicon 14b, each of which is formed into a conic shape, for refracting the incident laser beam so as to form the section of the laser beam into an annular shape. Of these, the first axicon 14a refracts the laser beam, which is converted into circular parallel beam by the collimator lens 12 and anamorphic prisms 13a and 13b, and converts the refracted laser beam into annular divergent beam, as shown in FIG. 2. The second axicon 14b refracts the laser beam that is converted into the annular divergent beam by the first axicon 14a so as to convert the same into the annular parallel beam. In FIG. 2, the laser beam emitted from the laser source 11 is indicated by a broken line. The solid area at the inner portion of the laser beam indicates the portion of the laser beam, annularly formed by the orbicular zone forming lens group 14, where there is no beam.

The first axicon 14a and the second axicon 14b are arranged such that the respective conic surfaces are opposite to each other, and the first axicon 14a is attached so as to be displaceable in the optical axial direction of the laser beam with respect to the second axicon 14b. Specifically, the second axicon 14b is fixed to one end portion of a guide 21, which is disposed in the optical pickup apparatus along the optical axial direction, via a fixing member 22, and the first axicon 14a is attached to the other end of the guide 21 through a movable member 23 that is slidable in the axial direction of the guide 21. The other end of a spring 24, having one end pressed against a part of the optical pickup apparatus, is pressed against the bottom surface of the movable section 23. This urges the movable member 23, i.e., the first axicon 14a, toward the second axicon 14b. A cam 25 is provided at the upper side of the movable member 23, by which the upper surface of the movable member 23 is pressed against the cam 25 by the urging force of the spring 24.

The cam 25 is made of an elliptic curved outline. It is coupled to an electric motor 27 via a shaft 26 so as to rotate with the rotation of the electric motor 27. The electric motor 27 is coupled to an unillustrated controller, whereby the rotation of the electric motor 27 is controlled. Therefore, the movable member 23 is pushed down or pushed up by the rotational displacement of the cam 25 caused by the rotation of the electric motor 27. In this case, the movable member 23 displaces along the shaft direction of the guide 21 against the urging force of the spring 24 or with the urging force of the spring 24. Accordingly, the distance from the movable member 23, i.e., the first axicon 14*a* to the second axicon 14*b* is changed. An operator can optionally set the distance from the first axicon 14*a* to the second axicon 14*b* in the optical axial direction by operating the controller.

The internal diameter (the diameter of the portion having no beam) of the annularly formed laser beam is defined in accordance with the distance of the first axicon 14*a* to the second axicon 14*b*. The internal diameter of the annularly formed laser beam is set to a size necessary for eliminating a part of the laser beam (central portion) irradiated to the recording layers of the optical disc DK other than the recording layer thereof having an optical spot formed thereon. The setting of the internal diameter of the laser beam will be described later. The relationship between the distance of the first axicon 14*a* to the second axicon 14*b* and the internal diameter of the annularly formed laser beam is recognized beforehand by the operator. Further, the relationship between the distance of the first axicon 14*a* to the second axicon 14*b* and the rotational angle of the cam 25 is set beforehand by the controller. In FIG. 1, the laser beam emitted from the laser source 11 and the reflected beam reflected from the optical disc DK are indicated by a broken line. Further, the solid area at the inner portion of the laser beam and reflected beam indicates the portion of the laser beam, annularly formed by the orbicular zone forming lens group 14, where there is no beam.

The polarizing beam splitter 15 transmits the laser beam led from the orbicular zone forming lens group 14, and leads the same to the aberration correcting lens groups 16*a* and 16*b*, as well as it reflects the reflected beam from the optical disc DK in the direction orthogonal to the incident direction (right side in the figure). The aberration correcting lens groups 16*a* and 16*b* are lens groups mainly for correcting the spherical aberration generated in accordance with the thickness of the protection layer of the optical disc DK. The ¼ wavelength plate 17 converts the laser beam led from the aberration correcting lens groups 16*a* and 16*b* into a circular polarization from a linear polarization, and leads the converted polarization to the aperture 18. Further, the ¼ wavelength plate 17 converts the reflected beam from the optical disc DK into a liner polarization from a circular polarization, and leads the resultant to the aberration correcting lens groups 16*a* and 16*b*. The aperture 18 is annularly formed for directing the laser beam, which is directed through the ¼ wavelength plate 17, to the objective lens 19 as defining the outer diameter thereof.

The objective lens 19 converges the laser beam directed through the aperture 18 so as to form a circular optical spot on the optical disc DK. In this case, the position of the objective lens 19 in the optical axial direction is controlled by a focus servo control circuit, not shown, whereby the optical spot is selectively formed on one of the plural recording layers of the optical disc DK. The laser beam converged on the recording layer of the optical disc DK is reflected by the recording layer, and incident again on the polarizing beam splitter 15, as a reflected beam, through the objective lens 19, aperture 18, ¼ wavelength plate 17, and aberration correcting lens groups 16*a* and 16*b*. The polarizing beam splitter 15 reflects the incident reflected beam in the direction orthogonal to the incident direction (right side in the figure) for directing the same to a beam splitter 31 as described above.

The beam splitter 31 reflects a part of the incident reflected beam and directs the same to the condenser lens 32. Further, the beam splitter 31 transmits the other part of the reflected beam and directs the same to the condenser lens 35. The condenser lens 32 converges the incident reflected beam onto the photodetector 34 via a cylindrical lens 33. The cylindrical lens 33 is an optical device that generates astigmatism on the transmitted reflected beam. The photodetector 34 is composed of a four-divided light-receiving device including four light-receiving devices each having the same square shape and divided with a parting line. The respective light-receiving devices output the electrical signals respectively, which are in proportion to the light-receiving amount, as light-receiving signals. The light-receiving signals are supplied to the unillustrated focus servo control circuit and track servo control circuit to be used for the focus servo control and track servo control of the objective lens 19.

The condenser lens 35 converges the annular reflected beam, transmitted and led by the beam splitter 31, toward the pinhole plate 36 arranged on the optical axis of the reflected beam. The pinhole plate 36 is arranged at the position where the reflected beam from the recording layer having an optical spot formed thereon is converged. The pinhole plate 36 has a pinhole 36*a* corresponding to a diameter (beam waist diameter) of the converged flux of the reflected beam that is converged by the condenser lens 35 at the position on the optical axis of the reflected beam on a thin plate material having no light-transparency. The reflected beam passing through the pinhole 36*a* is led to the photodetector 37. The photodetector 37 is, like the photodetector 34, composed of a four-divided light-receiving device including four light-receiving devices each having the same square shape and divided with a parting line. The respective light-receiving devices output the electrical signals respectively, which are in proportion to the light-receiving amount, as light-receiving signals. The light-receiving signals are supplied to an unillustrated signal reproduction circuit to be used for the reproduction of the signal recorded on the optical disc DK.

Figure 3A:
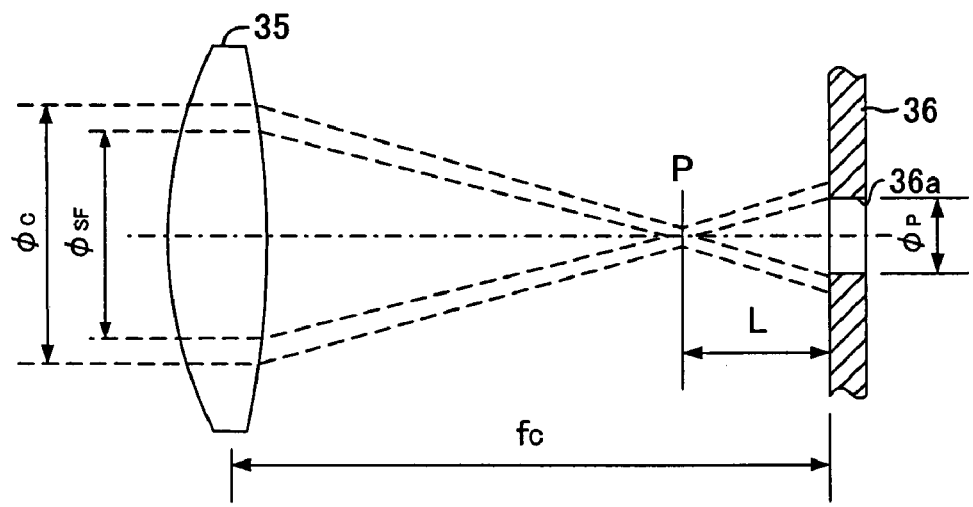
FIGS. 3A and 3B are explanatory views showing the converged state of the reflected beam from the recording layer other than the recording layer having an optical spot formed thereon, in view of the relation with a pinhole plate.
Figure 3B:
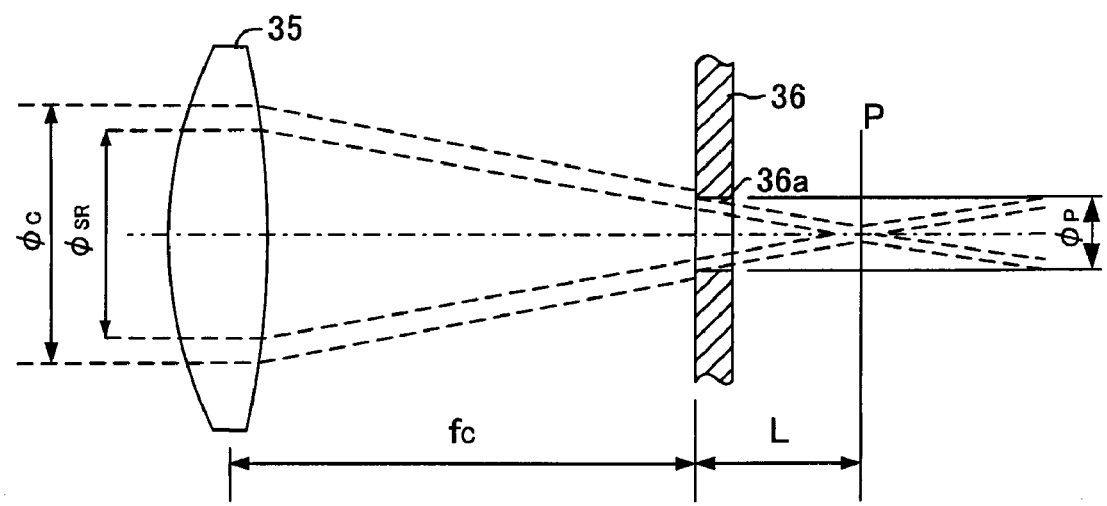

Explained here is the setting of the internal diameter of the laser beam (the diameter of the portion having no beam) annularly formed by the orbicular zone forming lens group 14. As described above, the internal diameter of the laser beam is set to a size necessary for eliminating a part of the laser beam irradiated to the recording layers of the optical disc DK other than the recording layer thereof having an optical spot formed thereon. When an interlayer crosstalk occurs, the focal position of the reflected beam from the recording layers other than the recording layer having an optical spot formed thereon by the condenser lens is shifted in the front-to-rear direction of the pinhole plate 36. Specifically, as shown in FIG. 3A, the focal position of the reflected beam from the recording layers, located at the side opposite to the objective lens 19, other than the recording layer having an optical spot formed thereon is shifted toward the front of the pinhole plate 36. On the other hand, as shown in FIG. 3B, the focal position of the reflected beam from the recording layers, located at the side same as the objective lens 19, other than the recording layer having an optical spot formed thereon is shifted toward the back of the pinhole plate 36. In this case, each of the shifting amounts of the focal positions from the pinhole plate 36 corresponds to the interlayer distance (interlayer gap) of each recording layer.

In these cases, the reflected beam from the recording layers other than the recording layer having an optical spot formed thereon is led to the photodetector 37 within a range of the size of the pinhole 36a formed on the pinhole plate 36. Accordingly, if the central portion of the laser beam irradiated to the other recording layers is removed by the size greater than the size corresponding to the diameter of the pinhole 36a, it is prevented that a part of the reflected beam from the other recording layers transmits the pinhole 36a to be led to the photodetector 37. Specifically, the internal diameter of the laser beam annularly formed by the orbicular zone forming lens group 14 is set such that the central portion of the laser beam irradiated to the optical disc DK is removed so as to form the section of the laser beam into an annular shape, and the internal diameter (diameter of the portion having no beam) of the annular optical spot corresponds to the diameter of the pinhole 36a.

The diameter $\phi_P$ of the pinhole 36a on the pinhole plate 36 is firstly calculated under the condition that the wavelength of the laser beam emitted from the laser source 11 is defined as $\lambda$, the diameter of the flux of the reflected beam from the optical disc DK, i.e., the diameter of the flux of the laser beam defined by the aperture 18 is defined as $\phi_C$, the focal distance of the objective lens 19 is defined as $f_O$, the focal distance of the condenser lens 35 is defined as $f_C$, and the interlayer gap of the optical disc DK is defined as $\Delta T$. The diameter $\phi_P$ of the pinhole 36a corresponds to the diameter (beam waist diameter) of the flux of the reflected beam converged by the condenser lens 35, and calculated in accordance with the following equation 1. Since the diameter $\phi_P$ of the pinhole 36a calculated in accordance with the equation 1 is the minimum diameter required to transmit the reflected beam converged by the condenser lens 35, the value greater than the value calculated from the equation 1 may be employed as the diameter $\phi_P$.

$$\phi_P = K \times \lambda / (\phi_C/(2 \times f_C)) \qquad \text{Equation 1}$$

The equation 1 described above is obtained by applying the general equation for calculating the flux diameter (beam waist diameter) D of the laser beam, that is $D = K \times \lambda / NA$, to the present embodiment. In these equations, K is a coefficient set from the light intensity distribution of the laser beam. When the light intensity is generally uniform, K is 1.22. In this case, if the light intensity distribution is defined by the intensity of $1/e^2$ (e is a base of a natural logarithm), K is 0.82. When the light intensity distribution takes an orbicular form, K takes a value generally 1.0 to 0.8 times the 1.22 (or 0.82). In the present embodiment, the light intensity distribution of the reflected beam incident on the condenser lens 35 by the orbicular zone forming lens group 14 is Gaussian distribution, the coefficient K assumes 0.6 to 1.22 according to the size of the internal diameter of the laser beam that is converted into annular parallel beam by the orbicular zone forming lens group 14. NA is a numerical aperture of the condenser lens 21, and is approximated by $(\phi_C/(2 \times f_C))$.

Subsequently, the distance L from the convergent point where the reflected beam from the recording layers other than the recording layer having an optical spot formed thereon is converged by the condenser lens 35 to the pinhole 36a on the pinhole plate 36 is calculated in accordance with the following equation 2. The following equation 2 is an approximate equation for approximately calculating the distance L, according to the interlayer gap $\Delta T$, from the focal distance $f_O$ of the objective lens 19 and the focal distance $f_C$ of the condenser lens 35.

$$L = (2 \times \Delta T) \times (f_C/f_O)^2 \qquad \text{Equation 2}$$

Subsequently, the internal diameter $\phi_S$ of the laser beam annularly formed by the orbicular zone forming lens group 14 is calculated. In this case, as shown in FIGS. 3A and 3B, the angle of the converged reflected beam to the optical axis is different depending upon the position of the convergent point P of the reflected beam, whereby the calculated internal diameter $\phi_S$ of the laser beam is also different depending upon the position of the convergent point P. Specifically, when the convergent point P is shifted toward the back of the pinhole plate 36, the angle of the reflected beam to the optical axis becomes small, which means that the internal diameter of the annular converged flux formed on the pinhole plate 36 is smaller than that in the event that the convergent point P is shifted toward the front of the pinhole plate 36. Therefore, when the internal diameter of the laser beam is set such that the internal diameter of the converged flux becomes greater than the diameter $\phi_P$ of the pinhole 36a, the internal diameter $\phi_S$ becomes greater than that in the event that the convergent point P is positioned at the front of the pinhole plate 36.

Firstly, the internal diameter $\phi_S$ in the event that the convergent point P is located at the front of the pinhole plate 36 as shown in FIG. 3A is calculated. The following equation 3 is established if the internal diameter of the annular converged flux of the reflected beam from the other recording layers formed on the pinhole plate 36 through the convergent point P is made equal to the diameter of the pinhole $\phi_P$, and the diameter of the portion, having no beam, at the central portion of the reflected beam incident on the condenser lens 35 in this case, i.e., the internal diameter of the annular laser beam is $\phi_{SF}$. The equation 3 is changed to the following equation 4. In this case, the internal diameter $\phi_{SF}$ of the laser beam can be defined by the equation 5, since the internal diameter $\phi_{SF}$ of the laser beam indicates the minimum size of the internal diameter $\phi_S$ of the annular laser beam formed by the orbicular zone forming lens group 14.

$$(\phi_P/2)/L = (\phi_{SF}/2)/(f_C - L) \qquad \text{Equation 3}$$

$$\phi_{SF} = f_C \times \phi_P/L - \phi_P \qquad \text{Equation 4}$$

$$\phi_{SF} \geq f_C \times \phi_P/L - \phi_P \qquad \text{Equation 5}$$

Next, the internal diameter $\phi_S$ in the event that the convergent point P is located at the back of the pinhole plate 36 as shown in FIG. 3B is calculated. In this case, a part of the reflected beam from the other recording layers converged by the condenser lens 35, i.e., the portion inner from the pinhole 36a when the reflected beam is irradiated to the periphery of the pinhole 36a on the pinhole plate 36, passes through the pinhole 36a to be converged at the back of the pinhole plate 36. Accordingly, the following equation 6 is established, like the equation 3, if the diameter of the portion, having no beam, at the central portion of the reflected beam when the reflected beam reaches the pinhole 36 is made equal to the diameter of the pinhole $\phi_P$, and the internal diameter of the laser beam in this case is $\phi_{SR}$. Similar to the above-mentioned case, the internal diameter $\phi_{SR}$ of the laser beam can be defined by the following equation 7 on the basis of the following equation 6.

$$(\phi_P/2)/L = (\phi_{SR}/2)/(f_C + L) \qquad \text{Equation 6}$$

$$\phi_{SR} \geq f_C \times \phi_P/L + \phi_P \qquad \text{Equation 7}$$

Comparing the internal diameter $\phi_{SF}$ and the internal diameter $\phi_{SR}$ of the laser beam defined respectively by the equations 5 and 7, the internal diameter $\phi_{SR}$ is always greater than the internal diameter $\phi_{SF}$. Therefore, the internal diameter $\phi_{SR}$ may be employed as the internal diameter $\phi_S$ of the laser beam. Further, in this case, if the focal distances $(f_C - L)$ and $(f_C + L)$ of the reflected beam indicated in the equations 3 and 6 are approximated to the focal distance $f_C$ of the condenser lens 35, the internal diameter $\phi_S$ of the laser beam can also be defined by the following approximate equation 8. The internal diameter $\phi_S$ of the laser beam calculated by the following equation 8 is an intermediate value between the internal diameter $\phi_{SF}$ and the internal diameter $\phi_{SR}$ defined by the equations 5 and 7. In the present embodiment, the value approximately calculated by the equation 8 is employed as the internal diameter $\phi_S$ of the laser beam.

$$\phi_S \gtrsim f_C \times \phi_P / L \qquad \text{Equation 8}$$

When the optical pickup apparatus thus configured is used, the optical disc DK is arranged at the predetermined position above the objective lens 19, and a power of an unillustrated optical disc apparatus provided with the optical pickup apparatus is turned on. An operator performs positioning of the first axicon 14a to the second axicon 14b in the orbicular zone forming lens group 14. Specifically, the operator instructs, to the controller in the optical disc apparatus, the distance between the first axicon 14a and the second axicon 14b corresponding to the internal diameter $\phi_S$ of the annular laser beam calculated by using the above-mentioned equations 1 to 8. The controller controls the rotational drive of the electric motor 27 so as to rotate the cam 25 in response to the instruction. By virtue of this operation, the first axicon 14a starts to displace, thereby being positioned at the location apart from the second axicon 14b by the above-described distance, i.e., at the location where the internal diameter of the annular laser beam formed by the orbicular zone forming lens group 14 assumes the calculated internal diameter $\phi_S$.

Then, the operator causes the optical disc apparatus to reproduce the signal recorded on each recording layer of the optical disc DK. Specifically, the operator operates the controller to rotate the optical disc DK and emit laser beam from the laser source 11. The emission of the laser beam from the laser source 11 is controlled by an unillustrated laser drive circuit in the optical disc apparatus, in such a manner that continuous laser beam having fixed level for reproducing the signal recorded on the optical disc DK is emitted. The laser beam emitted from the laser source 11 is converted into parallel beam by the collimator lens 12, the section of which is shaped into a circle by the anamorphic prisms 13a and 13b, and then, led to the orbicular zone forming lens group 14.

The laser beam led to the orbicular zone forming lens group 14 is converted into divergent beam whose section is annular by the first axicon 14a, and then, converted into parallel beam whose section is annular by the second axicon 14b to be led to the objective lens 19 through the polarizing beam splitter 15, aberration correcting lens groups 16a and 16b, ¼ wavelength plate 17, and aperture 18. In this case, the internal diameter (the diameter of the portion having no beam) of the annularly formed laser beam assumes the calculated internal diameter $\phi_S$. Specifically, the beam at the central portion of the laser beam is removed in order that, when the reflected beam from the other recording layers is converged by the condenser lens 35 to form the annular converged flux on the pinhole plate 36, the internal diameter of the converged flux (the size of the portion having no beam) becomes greater than the diameter of the pinhole 36a.

Figure 4:
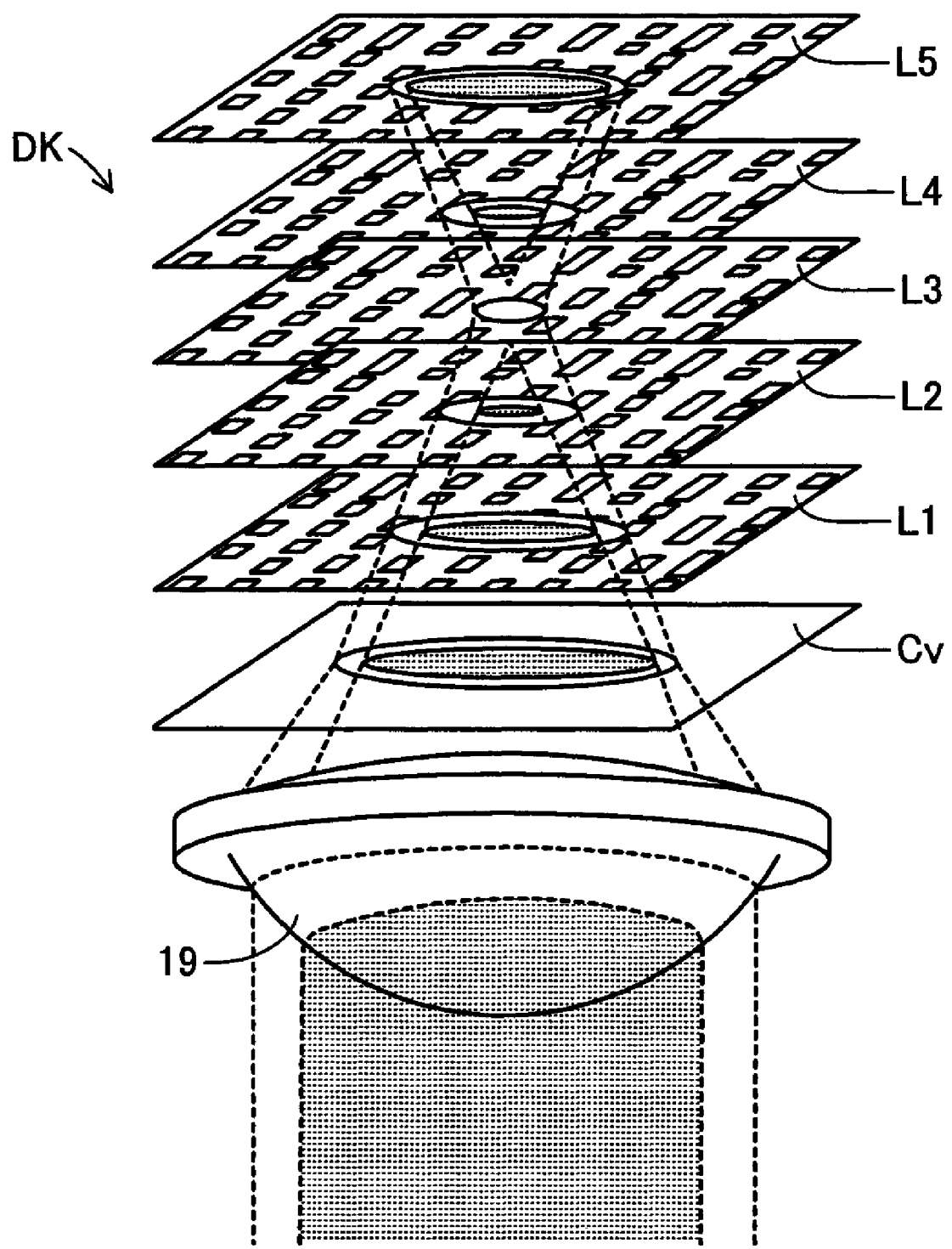
FIG. 4 is an explanatory view for explaining the shape of the laser beam irradiated on each of the recording layers of the multi-layer optical disc.

The laser beam incident on the objective lens 19 is converged on the predetermined recording layer (e.g., recording layer L3) on the optical disc DK as shown in FIG. 4. In this case, a circular optical spot is formed on the recording layer L3 on which the laser beam is converged by the objective lens 19, while annular laser beam is formed on the recording layers L1, L2, L4, and L5 other than the recording layer L3, and a cover layer $C_V$. The laser beam is reflected on the recording layer L3 in accordance with the signal recorded on the recording layer L3. The laser beam is reflected on the recording layers L1, L2, L4 and L5, other than the recording layer L3, at the portion where the laser beam is irradiated, i.e., at the annular portion, in accordance with the signals recorded on the other recording layers L1, L2, L4 and L5. The reflected beams from the other recording layers L1, L2, L4 and L5 form interlayer crosstalk. Each of the reflected beams is incident on the polarizing beam splitter 15 through the objective lens 19, aperture 18, ¼ wavelength plate 17 and aberration correcting lens groups 16a and 16b.

The reflected beam incident on the polarizing beam splitter 15 is led to the beam splitter 31. A part of the reflected beam led to the beam splitter 31 is reflected to be led to the condenser lens 32, while the other part of the reflected beam passes to be led to the condenser lens 35. The reflected beam led to the condenser lens 32 is converged on the photodetector 34 through the cylindrical lens 32. The photodetector 34 outputs the light-receiving signal according to the quantity of light of the received reflected beam to the unillustrated focus servo control circuit and track servo control circuit. The focus servo control circuit and track servo control circuit perform focus servo control and track servo control of the objective lens 19 on the basis of the light-receiving signal.

Figure 5A:
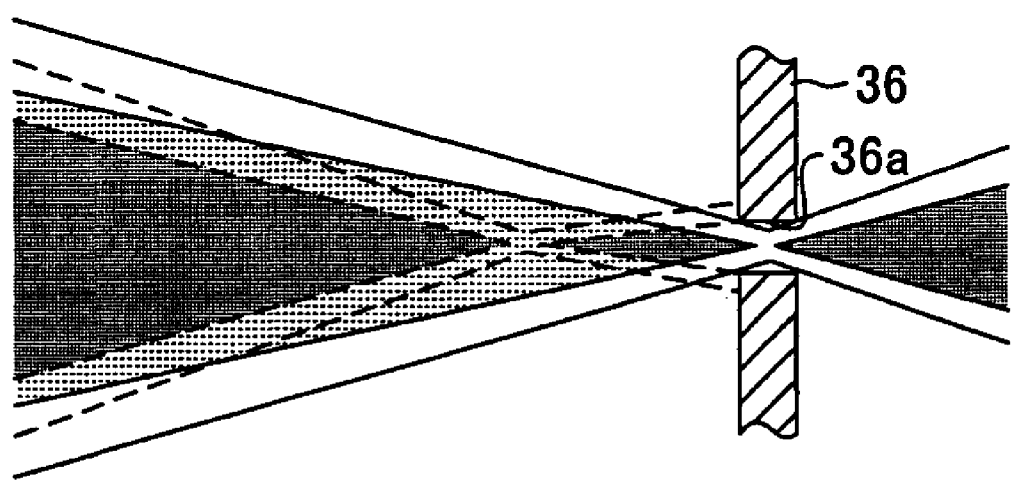
FIGS. 5A and 5B are explanatory views showing the state in which the reflected beam from the recording layer having the optical spot formed thereon and the reflected beam from the other recording layer pass through the pinhole plate or is shielded.
Figure 5B:
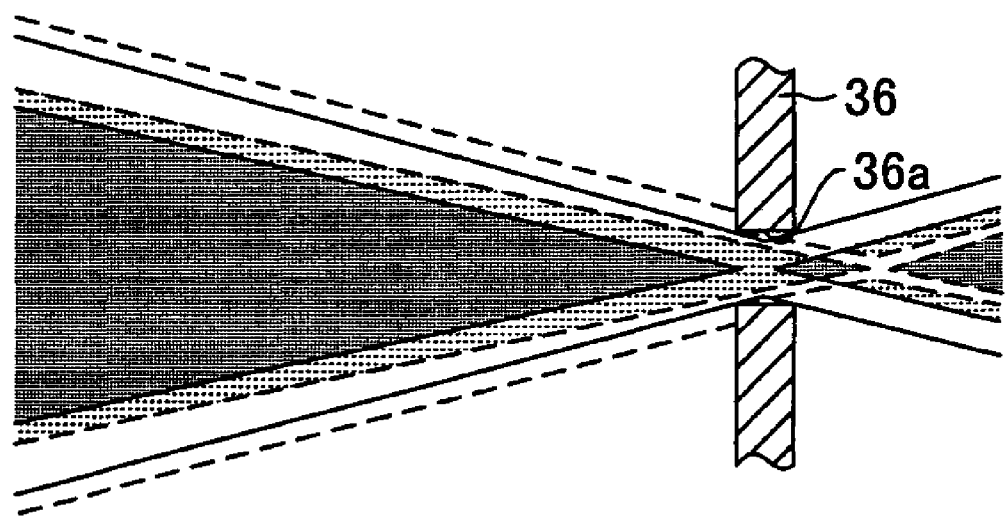

The reflected beam led to the condenser lens 35 is converged to the vicinity of the pinhole 36a of the pinhole plate 36 as shown in FIGS. 5A and 5B. Specifically, the reflected beam (indicated by a solid line in the figure) from the recording layer (recording layer L3) having the optical spot formed thereon is converged in the pinhole 36a of the pinhole plate 36, and passes through the pinhole 36a to be led to the photodetector 37. In this case, since the diameter of the pinhole 36a corresponds to the diameter (beam waist diameter) of the flux of the reflected beam converged by the condenser lens 35, the reflected beam is led to the photodetector 37 without being blocked by the pinhole plate 36.

As shown in FIG. 5A, the reflected beam (indicated by a broken line in the figure) from the other recording layer (recording layer L4) opposite to the objective lens 19 with respect to the recording layer (recording layer L3) having the optical spot formed thereon is converged at the front of the pinhole plate 36, and then, forms the annular converged flux at the periphery of the pinhole 36a of the pinhole plate 36. In this case, since the internal diameter of the annular converged flux formed at the periphery of the pinhole 36a, i.e., the diameter of the portion having no beam, is greater than the diameter of the pinhole 36a, the reflected beam does not pass through the pinhole plate 36, and hence, is not led to the photodetector 37.

As shown in FIG. 5B, a part of the reflected beam (indicated by a broken line in the figure) from the other recording layer (recording layer L2) at the side of the objective lens 19 with respect to the recording layer (recording layer L3) having the optical spot formed thereon forms the converged flux at the periphery of the pinhole 36a of the pinhole plate 36, while the other part thereof passes through the pinhole 36a, and then, is converged at the back of the pinhole plate 36. Specifically, the portion of the reflected beam greater than the diameter of the pinhole 36a forms the converged flux at the periphery of the pinhole 36a, and the portion of the reflected beam smaller than the diameter of the pinhole 36a and greater than the diameter of the portion, having no beam, at the central portion of the reflected beam passes through the pinhole 36a to be converged, when the reflected beam from the other recording layer (recording layer L2) reaches the pinhole plate 36. This is because the diameter of the portion of the reflected beam having no beam is slightly smaller than the diameter of the pinhole 36a, since the value calculated by the approximate equation of the equation 8 is employed as the internal diameter $\phi_S$ upon setting the internal diameter $\phi_S$ of the annularly formed laser beam. However, since a part of the reflected beam, passing through the pinhole plate 36, from the other recording layer (recording layer L2) is extremely small, it can be neglected because the affect to the light-receiving signal is small even if the passing reflected beam is led to the photodetector 37.

In order to block all of the reflected beams from the other recording layer (recording layer L2), the internal diameter $\phi_{SR}$ calculated in accordance with the equation 7 may be employed as the internal diameter $\phi_S$, upon setting the internal diameter $\phi_S$ of the annularly formed laser beam. In this case, the converged flux formed at the periphery of the pinhole 36a takes an annular shape, and the internal diameter of the annular converged flux, i.e., the diameter of the portion having no beam, becomes greater than the diameter of the pinhole 36a, whereby the reflected beam does not pass through the pinhole plate 36, and is not led to the photodetector 37. In FIGS. 5A and 5B, the solid area at the inner portion of the reflected beam (indicated by the solid line in the figure) from the recording layer (recording layer L3) having the optical spot formed thereon and the reflected beam (indicated by the broken line in the figure) from the recording layers (recording layers L4, L2) other than the recording layer having the optical spot formed thereon indicates the portion from which beam is removed by the orbicular zone forming lens group 14.

The reflected beam passing through the pinhole 36a of the pinhole plate 36, specifically, the reflected beam (including a part of the reflected beam from the other recording layers (recording layer L2)) from the recording layer (recording layer L3) having the optical spot formed thereon is received by the photodetector 37. The photodetector 37 outputs the light-receiving signal according to the quantity of light of the received reflected beam to the unillustrated signal reproduction circuit. The signal reproduction circuit reproduces the recording signal from the optical disc DK on the basis of the light-receiving signal, i.e., the reflected beam from the recording layer (recording layer L3) having the optical spot formed thereon. When the signal reproduction is performed for the other optical disc DK after the signal reproduction is performed for one optical disc DK as described above, the positioning of the first axicon 14a is carried out according to need, and then, the reproduction of the other optical disc DK is performed. Specifically, when the optical disc DK having different degree of interlayer crosstalk is reproduced, the first axicon 14a is positioned again at the location corresponding to the interlayer crosstalk, and then, the reproduction of the other optical disc DK is performed.

As understood from the explanation of the operation, the above-mentioned embodiment focuses on the difference in the convergent position of the reflected beams from the recording layers of the optical disk DK having plural recording layers, other than the recording layer thereof having the optical spot formed thereon, wherein the pinhole plate 36 is arranged at the convergent position of the reflected beam from the recording layer having the optical spot formed thereon, and removes the central portion of the laser beam irradiated to the recording layers other than the recording layer so as to remove the reflected beam from the central portion of the converged flux formed on the pinhole plate 36 by the reflected beam from the other recording layers. According to this, there is no chance that the reflected beam from the other recording layers passes through the pinhole 36 and is led to the photodetector 37. Therefore, the light-receiving signal outputted from the photodetector 37 is generated only on the basis of the signal recorded on the recording layer having the optical spot formed thereon. As a result, this configuration can provide satisfactory reproduction precision of the signal recorded on the recording layer, which is the subject of the signal reproduction, without being affected by the interlayer crosstalk.

According to the present embodiment, the orbicular zone forming lens group 14 refracts the incident laser beam to form into an annular shape. Therefore, the laser beam can be led to the photodetector 37 without reducing the quantity of light of the incident laser beam, whereby the output level of the electrical signal outputted from the photodetector 37 cannot be reduced. Consequently, the reproduction precision of the signal recorded on the recording layer, which is the subject of the signal reproduction, can be kept satisfactory, while eliminating the interlayer crosstalk included in the reflected light from the optical disc DK.

Further, according to the present embodiment, the distance of the first axicon 14a to the second axicon 14b in the orbicular zone forming lens group 14 can appropriately be adjusted, whereby the internal diameter of the annularly formed laser beam can be set for every optical disk DK. Thus, the interlayer crosstalk can precisely be eliminated by a single optical pickup apparatus even between the optical discs DK each having different degree of interlayer crosstalk.

The present invention is not limited to the aforesaid embodiment, and various modifications are possible without departing from the spirit of the present invention.

In the above-mentioned embodiment, the orbicular zone forming lens group 14 is arranged between the anamorphic prisms 13a, 13b and the polarizing beam splitter 15. However, the invention is not limited thereto so long as the annular converged flux can be formed on the pinhole plate 36. For example, the orbicular zone forming lens group 14 may be arranged between the polarizing beam splitter 15 and the beam splitter 31, or between the beam splitter 31 and the condenser lens 35. In this case, the orbicular zone forming lens group 14 forms the reflected beam from the optical disc DK into an annular shape. Specifically, the central portion of the converged flux of the reflected beam from the other recording layers formed at the periphery of the pinhole 36a of the pinhole plate 36 is removed by the size greater than the diameter of the pinhole 36a, in order that a part of the reflected beam from the other recording layers does not pass through the pinhole 36a. By virtue of this configuration, the effect same as the above-mentioned embodiment can be expected.

The above-mentioned embodiment is configured to form the laser beam irradiated to the optical disc DK into an annular shape by using the orbicular zone forming lens group 14. However, the invention is not limited thereto so long as an optical device that can form the beam into an annular shape by refraction is used. For example, a single lens or prism having both functions of the first axicon 14a and the second axicon 14b may be employed. Further, the orbicular zone forming lens group 14 may be composed of the combination of optical devices each having a function equivalent to the functions of the first axicon 14a and the second axicon 14b. For example, Fresnel axicon or holographic axicon in which the thickness of each of the first axicon 14a and the second axicon 14b is reduced may be employed. Further, a spherical lens or aspherical lens may be employed. The axicon includes, in this case, any optical devices having the function equivalent to the axicon, irrespective of the name, such as cone lens, cone prism, conical lens, conical prism, and the like, in addition to axicon lens and axicon prism.

Figure 6A:
FIG. 6A is a sectional view of a Fresnel axicon.
Figure 6B:
FIG. 6B is a sectional view of a holographic axicon.

In this case, the Fresnel axicon is a plate-like lens in which the conic surface of the conic axicon lens is concentrically arranged. As shown in FIG. 6A, the surface through which beam is transmitted has a serrated section. The holographic axicon is a plate-like lens utilizing the diffraction of light. As shown in FIG. 6B, the surface thereof through which light is transmitted has a rectangular section provided with plural grooves. FIGS. 6A and 6B exaggeratedly show the shape of each lens in order to indicate the feature of the Fresnel axicon and holographic axicon. According to these configurations, the effect same as the above-mentioned embodiment can be expected.

In the above-mentioned embodiment, the first axicon 14a in the orbicular zone forming lens group 14 is configured to be displaceable with respect to the second axicon 14b. However, the invention is not limited thereto so long as the relative distance between the first axicon 14a and the second axicon 14b can be changed. Specifically, the second axicon 14b may be configured to be displaceable with respect to the first axicon 14a, or the first axicon 14a and the second axicon 14b may be configured to be displaceable with each other. According to these configurations, the effect same as the above-mentioned embodiment can be expected.

In the above-mentioned embodiment, the position of the first axicon 14a to the second axicon 14b is changed by using the guide 21, spring 24, cam 25, and electric motor 27. However, the invention is not limited thereto so long as the relative distance between the first axicon 14a and the second axicon 14b can be changed. For example, an eccentric pin may be used instead of the cam 25. Alternatively, the cam 25 (or eccentric pin) is rotated by a manual operation by an operator, instead of the electric motor 27. Moreover, for example, lens holders for holding the first axicon 14a and the second axicon 14b respectively are provided in the optical pickup apparatus, wherein the first axicon 14a and the second axicon 14b are attached to each lens holder, and a shim having a predetermined thickness is interposed between each lens holder and the first axicon 14a and the second axicon 14b. The relative distance between the first axicon 14a and the second axicon 14b may be adjusted by the thickness of the shim. According to these configurations, the effect same as the above-mentioned embodiment can be expected.

Figure 7:
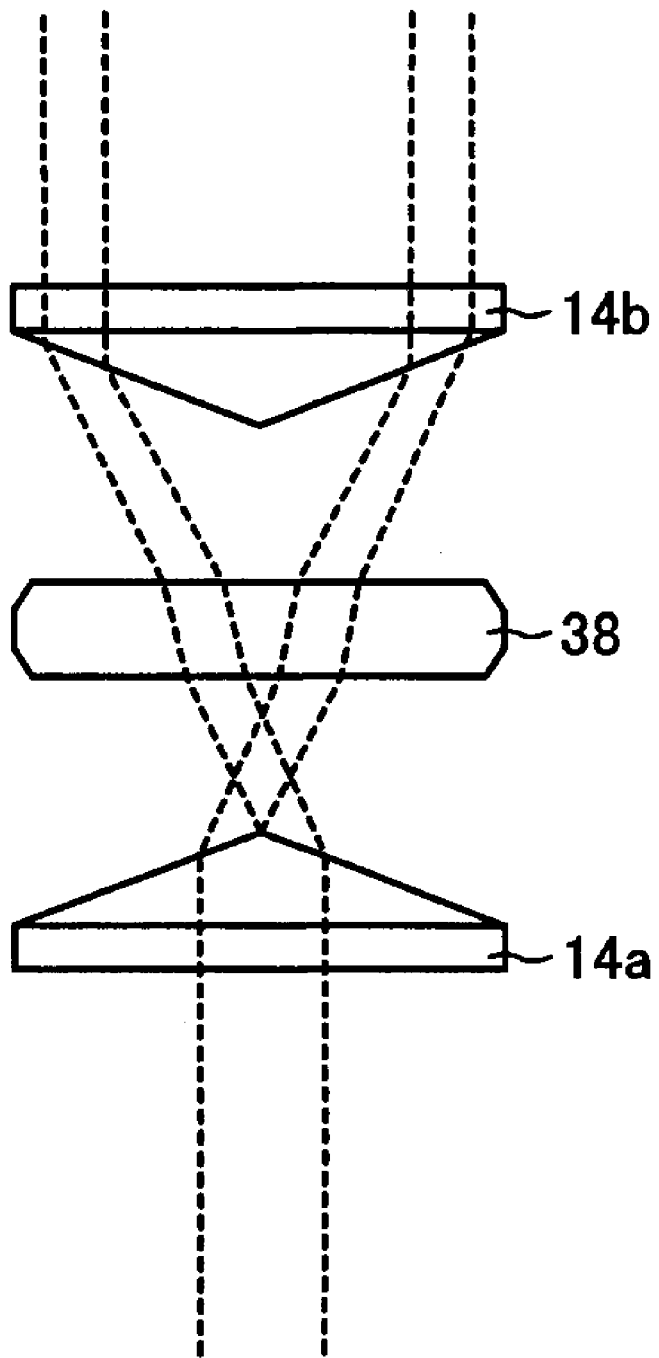
FIG. 7 is an explanatory view in which an internal diameter adjusting prism is arranged in an orbicular zone forming lens group according to a modified example of the present invention.

In the above-mentioned embodiment, the internal diameter of the annularly formed laser beam formed by the orbicular zone forming lens group 14 is changed by changing the position of the first axicon 14a to the second axicon 14b. However, the invention is not limited thereto so long as the internal diameter of the annular laser beam formed by the orbicular zone forming lens group 14 can be changed. For example, an internal-diameter adjusting prism 38 that changes, by the refraction, the diameter of the divergent beam converted by the first axicon 14a may be arranged between the first axicon 14a and the second axicon 14b, as shown in FIG. 7. By virtue of this configuration, the internal diameter of the annular laser beam formed by the orbicular zone forming lens group 14 can be changed, and the effect same as the above-mentioned embodiment can be expected. Further, an optical lens having a predetermined refractivity may be used instead of the internal-diameter adjusting prism 38. Moreover, a liquid crystal device (not shown) whose refractivity is changed according to an electrical signal may be used. By virtue of this configuration, the internal diameter of the annular laser beam formed by the orbicular zone forming lens group 14 can be promptly changed by appropriately changing the refractivity.

In the above-mentioned embodiment, the distance between the first axicon 14a and the second axicon 14b in the orbicular zone forming lens group 14 can be changed. However, when it is unnecessary to change the internal diameter of the annular laser beam formed by the orbicular zone forming lens group 14, the first axicon 14a and the second axicon 14b may be fixedly attached in the optical pickup apparatus. In this case, the effect same as the above-mentioned embodiment can be expected, except for the effect that the internal diameter of the annular laser beam can appropriately be changed according to the interlayer crosstalk.

In the above-mentioned embodiment, the internal diameter $\phi_S$ of the annularly formed laser beam is defined in accordance with the aforesaid equations 3 to 8 by using the distance L calculated from the equation 2, i.e., the distance from the convergent point where the reflected beam from the recording layers other than the recording layer having an optical spot formed thereon is converged to the pinhole 36a of the pinhole plate 36. However, the internal diameter $\phi_S$ of the annularly formed laser beam may be defined in accordance with the equations 3 to 8 by using the value half the distance L. Specifically, the internal diameter $\phi_S$ of the laser beam may be defined by using the following equations 9 or 10.

$$\phi_S \geqq f_C \times \phi_P \times 2/L \qquad \text{Equation 9}$$

$$\phi_S \geqq f_C \times \phi_P \times 2/L + \phi_P \qquad \text{Equation 10}$$

By virtue of this, the internal diameter $\phi_S$ increases by the amount corresponding to the amount half the distance L, compared to the case in which the internal diameter $\phi_S$ of the laser beam is calculated by using the distance L in the equations 3 to 8. In other words, the internal diameter $\phi_S$ of the laser beam assumes the internal diameter in the event that the interlayer distance (interlayer gap) of each recording layer is halved. Therefore, the reflected beam from the recording layers other than the recording layer, which is the subject of the signal reproduction, is more strictly eliminated. Thus, the reproduction precision of the signal recorded on the recording layer, which is the subject of the signal reproduction, can be made more satisfactory.

In this case, the reflected beam from the layer other than the layer where the laser beam is converged is strictly eliminated. Specifically, in case where the laser beam is converged to the layer (intermediate layer) between the recording layers, the reflected beam from the recording layers adjacent to the convergent position can also be shielded. Thus, when the focus servo control of the objective lens 19 is performed by an astigmatism method, etc., SUM signal synchronized with the focus error signal can precisely be detected, whereby the focus servo control of the objective lens 19 for the optical disc DK having plural recording layers can precisely be performed.

In the above-mentioned embodiment, the position of the orbicular zone forming lens group 14 is fixed regardless of the displacement of the objective lens 19 by the tracking servo control and focus servo control for the objective lens 19. However, the invention is not limited thereto. Specifically, an actuator for displacing the orbicular zone forming lens group 14 in the diameter direction of the optical disc DK and in the optical axial direction of the laser beam emitted from the laser source 11 is provided, wherein the orbicular zone forming lens group 14 may be displaced according to the displacement of the objective lens 19. By virtue of this configuration, even if the positional relationship between the objective lens 19 and the orbicular zone forming lens group 14 varies, this positional relationship can always be kept constant. Accordingly, the center of the portion, having no beam, of the annular converged flux reflected from the other recording layers to be formed on the pinhole plate 36 coincides with the center of the optical axis of the annular converged flux, so that they are always concentric. Specifically, it is prevented that the laser beam from the other recording layers passes through the pinhole 36a of the pinhole plate 36 due to the shift of the center of the central portion, having no beam, of the annular converged flux. Consequently, even if the objective lens 19 is displaced by the tracking servo control and focus servo control, a satisfactory reproduction precision of the signal recorded on the recording layer, which is the subject of the signal reproduction, can be provided without being affected by the interlayer crosstalk.

The polarizing beam splitter 15 that transmits and reflects the laser beam according to the polarizing direction of the laser beam emitted from the laser source 11 is used in the above-mentioned embodiment. However, any other optical devices may be employed, so long as they can lead the laser beam emitted from the laser source 11 to the optical disc DK and lead the reflected beam from the optical disc DK to the photodetector 37. For example, a half mirror that transmits and reflects a half of the incident beam may be employed, instead of the polarizing beam splitter 15.

The above-mentioned embodiment employs an optical disc having plural recording layers laminated at fixed intervals as the optical disc DK. However, instead of such optical disc, an optical disc having plural recording layers laminated at different intervals may be employed as the optical disc DK. In this case, the internal diameter $\phi_S$ of the annularly formed laser beam may be set on the basis of the smallest interlayer gap. According to this configuration, the effect same as that in the above-mentioned embodiment can be expected.

The above-mentioned embodiment employs BD (Blu-ray Disc) as the optical disc DK. However, the invention is not limited thereto, and any optical discs may be used, so long as they have plural recording layers. Specifically, optical discs such as CD, DVD, HD, DVD, etc., or next-generation optical discs may be used, instead of BD. According to this, the effect same as that in the above-mentioned embodiment can be expected.

What is claimed is:

1. An optical pickup apparatus comprising:
    a laser source that emits laser beam to a multi-layer optical disc having plural recording layers;
    a photodetector that receives the laser beam reflected by the multi-layer optical disc and outputs an electrical signal according to the received amount of beam;
    a collimator lens that converts the laser beam incident thereto from the laser source into parallel beam;
    a beam splitter that transmits or reflects the laser beam, which is converted into parallel beam by the collimator lens, to be led to the multi-layer optical disc, and transmits or reflects the laser beam reflected by the multi-layer optical disc to be led to the photodetector;
    an objective lens that converges the laser beam, which is led to the multi-layer optical disc by the beam splitter, so as to form an optical spot on one of the plural recording layers;
    a condenser lens that converges the laser beam from the multi-layer optical disc led by the beam splitter in the vicinity of the photodetector;
    orbicular zone forming optical means that is arranged between the collimator lens and the beam splitter, or between the beam splitter and the condenser lens, for forming the section of the laser beam into an annular shape by refracting the laser beam converted into the parallel beam by the collimator lens; and
    a pinhole plate having formed thereto a pinhole that transmits the laser beam reflected from the one recording layer and converged by the condenser lens,
    wherein the laser beam, that is reflected from a recording layer other than the one recording layer, forms an annular converged flux at the periphery of the pinhole of the pinhole plate.

2. An optical pickup apparatus according to claim 1, wherein
    the internal diameter of the annular converged flux formed at the periphery of the pinhole of the pinhole plate is greater than the diameter of the pinhole.

3. An optical pickup apparatus according to claim 1, wherein
    the orbicular zone forming optical means includes:
    a first optical device that converts the laser beam, which is converted into the parallel beam by the collimator lens, into annular divergent beam, and a second optical device that converts the laser beam, which is converted into the annular divergent beam, into the annular parallel beam.

4. An optical pickup apparatus according to claim 3, further comprising:
    internal-diameter adjusting means for changing the internal diameter of the annular laser beam formed by the orbicular zone forming optical means.

5. An optical pickup apparatus according to claim 4, wherein
    the internal-diameter adjusting means changes the internal diameter of the annular laser beam formed by the orbicular zone forming optical means by changing the relative distance between the first optical device and the second optical device.

6. An optical pickup apparatus according to claim 4, wherein
    the internal-diameter adjusting means changes the internal diameter of the annular laser beam formed by the orbicular zone forming optical means by refracting the annular divergent beam converted by the first optical device to be led to the second optical device.

7. An optical pickup apparatus according to claim 1, wherein
    the internal diameter $\phi_S$ of the laser beam that is annularly formed by the orbicular zone forming optical means is defined by the equation of $\phi_S \geq f_C \times \phi_P/L$, wherein the focal distance of the condenser lens is $f_C$, the diameter of the pinhole is $\phi_P$, and the distance from the convergent point, where the laser beam reflected by the other recording layers is converged by the condenser lens, to the pinhole is L.

8. An optical pickup apparatus according to claim 7, wherein
    the diameter $\phi_P$ of the pinhole is defined by the equation of $\phi_P \geq K \times \lambda/(\phi_C/(2 \times f_C))$, wherein the coefficient set by the distribution of light intensity of the laser beam emitted from the laser source is K, the wavelength of the laser beam emitted from the laser source is $\lambda$, and the diameter of the flux of the laser beam incident on the condenser lens from the multi-layer optical disc is $\phi_C$.

9. An optical pickup apparatus according to claim 1, wherein
    the internal diameter $\phi_S$ of the laser beam that is annularly formed by the orbicular zone forming optical means is defined by the equation of $\phi_S \geq f_C \times \phi_P/L + \phi_P$, wherein the focal distance of the condenser lens is $f_C$, the diameter of the pinhole is $\phi_P$, and the distance from the convergent point, where the laser beam reflected by the other recording layers is converged by the condenser lens, to the pinhole is L.

10. An optical pickup apparatus according to claim 9, wherein
    the diameter $\phi_P$ of the pinhole is defined by the equation of $\phi_P \geq K \times \lambda/(\phi_C/(2 \times f_C))$, wherein the coefficient set by the distribution of light intensity of the laser beam emitted from the laser source is K, the wavelength of the laser beam emitted from the laser source is λ, and the diameter of the flux of the laser beam incident on the condenser lens from the multi-layer optical disc is $\phi_C$.

11. An optical pickup apparatus according to claim 1, wherein the internal diameter $\phi_S$ of the laser beam that is annularly formed by the orbicular zone forming optical means is defined by the equation of $\phi_S \geq f_C \times \phi_P \times 2/L$, wherein the focal distance of the condenser lens is $f_C$, the diameter of the pinhole is $\phi_P$, and the distance from the convergent point, where the laser beam reflected by the other recording layers is converged by the condenser lens, to the pinhole is L.

12. An optical pickup apparatus according to claim 11, wherein the diameter $\phi_P$ of the pinhole is defined by the equation of $\phi_P \geq K \times \lambda/(\phi_C/(2 \times f_C))$, wherein the coefficient set by the distribution of light intensity of the laser beam emitted from the laser source is K, the wavelength of the laser beam emitted from the laser source is λ, and the diameter of the flux of the laser beam incident on the condenser lens from the multi-layer optical disc is $\phi_C$.

13. An optical pickup apparatus according to claim 1, wherein the internal diameter $\phi_S$ of the laser beam that is annularly formed by the orbicular zone forming optical means is defined by the equation of $\phi_S \geq f_C \times \phi_P \times 2/L + \phi_P$, wherein the focal distance of the condenser lens is $f_C$, the diameter of the pinhole is $\phi_P$, and the distance from the convergent point, where the laser beam reflected by the other recording layers is converged by the condenser lens, to the pinhole is L.

14. An optical pickup apparatus according to claim 13, wherein the diameter $\phi_P$ of the pinhole is defined by the equation of $\phi_P \geq K \times \lambda/(\phi_C/(2 \times f_C))$, wherein the coefficient set by the distribution of light intensity of the laser beam emitted from the laser source is K, the wavelength of the laser beam emitted from the laser source is λ, and the diameter of the flux of the laser beam incident on the condenser lens from the multi-layer optical disc is $\phi_C$.

15. An optical pickup apparatus according to claim 1, wherein the objective lens is tracking-servo-controlled in the diameter direction of the multi-layer optical disc by tracking servo control means that causes the optical spot to follow the track of the multi-layer optical disc, and focus-servo-controlled in the optical axial direction of the laser beam by focus servo control means that makes the optical spot to follow each recording layer of the multi-layer optical disc, and comprises an actuator for displacing the orbicular zone forming optical means in the diameter direction of the multi-layer optical disc and optical axial direction of the laser beam, respectively, in accordance with the displacement of the objective lens by the tracking servo control means and the focus servo control means.

* * * * *